United States Patent [19]

Heinze et al.

[11] Patent Number: 4,528,051

[45] Date of Patent: Jul. 9, 1985

[54] FIBER REINFORCED COMPONENT AND METHOD FOR STRENGTHENING SUCH COMPONENTS

[75] Inventors: Frank Heinze, Hamburg; Heinz Richter, Munich, both of Fed. Rep. of Germany

[73] Assignee: Messerschmitt-Boelkow-Blohm Gesellschaft mbH, Munich, Fed. Rep. of Germany

[21] Appl. No.: 556,704

[22] Filed: Nov. 30, 1983

[30] Foreign Application Priority Data

Dec. 17, 1982 [DE] Fed. Rep. of Germany ....... 3246803

[51] Int. Cl.³ ................................................ B32B 7/08
[52] U.S. Cl. ...................................... 156/92; 156/324; 428/223; 428/284; 428/285; 428/286; 428/408
[58] Field of Search ............... 428/102, 103, 284, 285, 428/286, 290, 294, 295, 298, 300, 302, 408, 86, 119, 223; 156/91, 92, 324; 144/353

[56] References Cited

U.S. PATENT DOCUMENTS 3,837,985 9/1974 Chase ..................................... 156/91
4,350,728 9/1982 Huang et al. ...................... 428/408

FOREIGN PATENT DOCUMENTS 2261024 6/1973 Fed. Rep. of Germany ...... 428/223
545483 3/1977 U.S.S.R. ............................... 428/223

Primary Examiner—James J. Bell
Attorney, Agent, or Firm—W. G. Fasse; D. H. Kane, Jr.

[57] ABSTRACT

A structural component of fiber reinforced synthetic resin material is strengthened by a multitude of metal or synthetic material pins extending approximately perpendicularly through the layers of fibers and resin. The pins are bonded to the fibers and resin as a result of curing the resin after the pins have been driven into the resin fiber layers in the form of so-called prepregs. The pins are bent over at their end or at both ends to further improve the strength of the structural component especially with regard to preventing peeling of one layer away from an adjacent layer.

8 Claims, 5 Drawing Figures

FIBER REINFORCED COMPONENT AND METHOD FOR STRENGTHENING SUCH COMPONENTS

FIELD OF THE INVENTION

The invention relates to fiber reinforced components and to a method for strengthening such components. Fiber reinforced components comprise so-called prepregs which are preimpregnated layers of fiber reinforced synthetic materials which are normally subjected to compression and then hardened or cured.

DESCRIPTION OF THE PRIOR ART

Tests with such fiber reinforced structural components of synethetic resins have shown time and again that test results in the laboratory under exactly controlled conditions cannot be duplicated in actual structural components, depending on the shape of such components and depending on the layer constructions of these components. In other words, the actual strength values achieved in actual structural components do not match the strength values based on exactly controlled laboratory tests.

The causes for such differences in the strength values are the stress concentrations occurring where there is a sudden change in the stiffness of a structural component. Yet another cause for the these differences is seen in transverse shrinking occurring under load conditions. Such transverse shrinking causes stresses which cannot be taken up anymore by the interlaminar resistance or strength against peeling and by the transverse tensile strength. As a result, premature separation of the layers forming a structural component takes place in the form of a delamination of the layer construction.

Efforts have been made heretofore to control these phenomena by providing an overlapping layer construction at the endangered locations within a structural component. Attempts have also been made to assemble a structural component from several individual parts which are bonded to each other in the form of prepregs which are then cured and hardened together. All of these efforts however, are limited by the strength provided by resin bonding between the layers of a structural component.

OBJECTS OF THE INVENTION

In view of the foregoing it is the aim of the invention to achieve the following objects singly or in combination:

to provide a layered structural component in which the bonding strength between the adjacent layers is not limited by the strength of the resin bond;

to provide a method for increasing the transverse tensile strength of structural components made of fiber reinforced layers of synthetic resin so as to withstand high loads or stresses causing a peeling tendency;

to improve the interlaminar strength or resistance against peeling and thus the transverse tensile strength of the entire structural component independently of the resin bond; and to provide a strenghtening method for structural components as described herein which is equally effective regardless of the type of fibers employed in making the structural component.

SUMMARY OF THE INVENTION

According to the invention there is provided a structural component of fiber reinforced synthetic resin materials which comprises at least two layers through which reinforcing pins extend approximately perpendicularly to the surface of the component and thus to the direction of the fibers, whereby the pins are bonded into the structure as a result of the compression and subsequent curing of the resin.

According to the invention there is further provided a method for strengthening such fiber reinforced structural components of synthetic resin materials by driving pins into the layer or layers of the structural components prior to any compressing and hardening. Once the pins are properly driven into the layers, the compression and curing step takes place to provide the structural component with the desired shape and with a strong bonding between the reinforcing pins and the layered structure as a result of the resin curing.

Preferably or generally the pins extend approximately perpendicularly to the planes defined by the prepreg layers and the pin tips penetrate into the still soft prepreg layers. After the compression and curing the pins provide an additional bonding between the pre-preg layers to the bonding provided by the resin matrix. The pins increase the interlaminar resistance or strength against peeling severalfold and in doing so they also greatly improve the transverse tensile strength of the entire structural component. This additional strength feature is further improved by bending over the pin tips at both ends. Since the pins are driven into the layered matrix of prepregs while they are still soft, there is no problem with the insertion of the pins and the method may be employed in connection with all practically employed fibers, such as glass fibers, carbon fibers, aramide fibers, and other synthetic fibers of all kinds. Depending on the strength and weight requirements, the pins may be made of any material suitable for the purpose. The preferred material for the pins is Kevlar (RTM) or steel. Where the pins are attached to a belt prior to their insertion into the fiber layers, the belt may be made of a webbing which has sufficient hollow spaces between the threads forming the webbing so that when the compression is applied the spaces are filled with synthetic resin.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
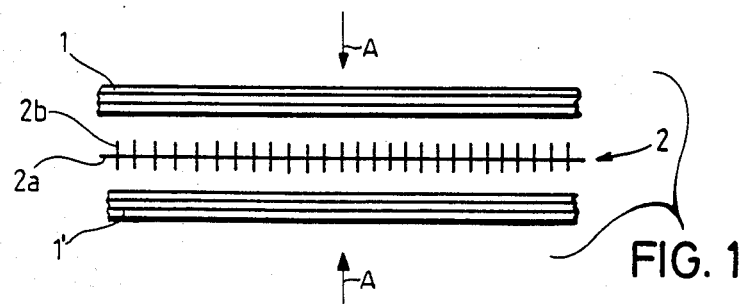
FIG. 1 shows an exploded side view of two layers of fiber reinforced synthetic resin material above and below a pin belt from which the pin ends extend on both sides.

FIG. 1 shows two prepreg layers 1 and 1' in which the synthetic fibers are embedded in a not yet cured resin matrix. A pin carrier 2 in the form of a belt or webbing 2a having inserted therein a plurality of pins 2b is located between the layers 1 and 1'. The pins 2b extend in this example on both sides of the belt or webbing 2a. Once the elements of the structural components are in the position shown in FIG. 1, compression is applied as indicated by the arrows A so that the pins 2b may penetrate into the layers 1 and 1'. The compression and curing may be applied simultaneously or sequentially.

Figure 2:
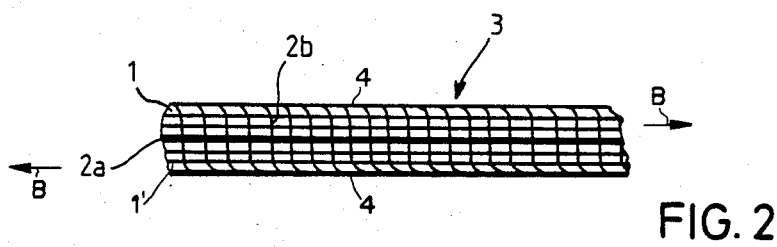
FIG. 2 is a view similar to that of FIG. 1, however, after the compression and curing.

FIG. 2 shows the structural component 3 resulting from the steps described with reference to FIG. 1, wherein the pins 2b are slightly curved or bent over at their both ends as shown at 4. These bends or curved ends 4 of the pins 2b additionally improve the strength of the structural component 3, especially the resulting transverse tensile strength which prevents the peeling of the layers 1, 1' is greatly improved. This transverse strength is effective against loads indicated by the arrows B.

Figure 3:
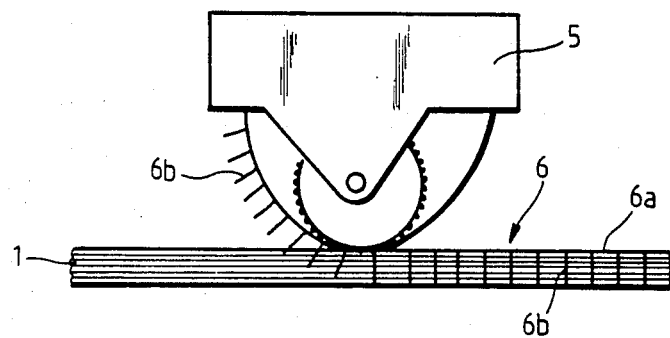
FIG. 3 illustrates another way of inserting the pins into a layered structural component.

FIG. 3 illustrates another embodiment of the method according to the invention in which the pins 6b are driven into the layer 1 by a roller apparatus 5, whereby the webbing 6a of the pin belt 6 forms the top surface of the layer 1. In other words, the webbing 6a is bonded to the layer 1 as a result of the curing with the pins 6b also being bonded to the internal structure of the resin matrix.

The method illustrated in FIGS. 1, 2 and 3 makes it possible to handle lamination thicknesses in the range of about 0.5 to 5 mm, whereby in accordance with the thickness of the lamination the pins will be selected to be slightly longer to provide for the bending 4 as shown in FIG. 2. Depending on the structural and strength requirements of any individual case, the pin density on the belt or webbing 2a, 6a will be such that the spacing between adjacent pins is within the range of 0.5 to 5 mm. The diameter of the pins will be in the range of 0.1 mm to 1.0 mm.

In the method illustrated with reference to FIGS. 1 to 3, it is practical to use rather stiff pins, for example, made of steel. However, it is also possible to use pins of synthetic material, for example, made of Kevlar (RTM), whereby a weight reduction may be achieved and even a better bonding between the pins and the prepreg layers.

Figure 4:
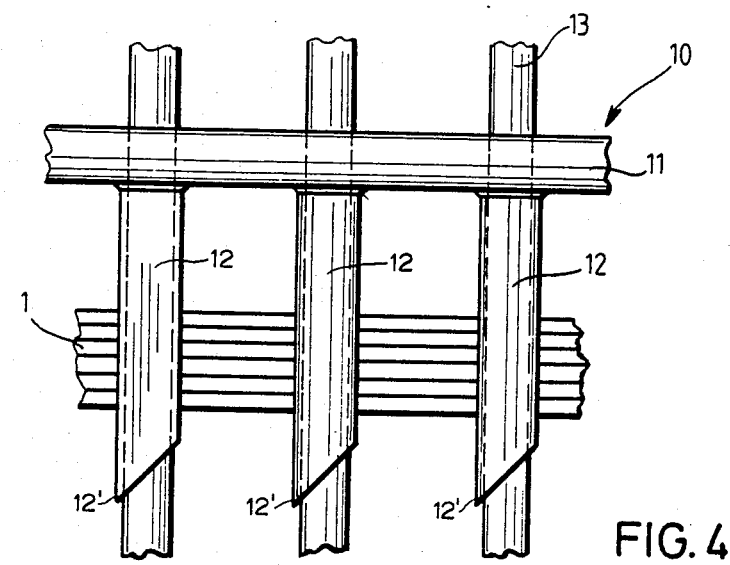
FIG. 4 illustrates another way of driving the pins through a layered structure.
Figure 5:
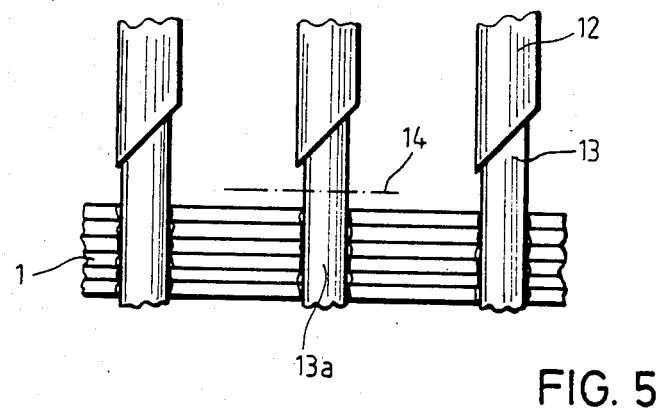
FIG. 5 shows the hollow tubular members withdrawn again from the layered structure so that cutting of the pins may take place.

FIGS. 4 and 5 illustrate a method for inserting relatively flexible pins 13a which may be threads 13 of Kevlar (RTM). For this purpose a type of stitching mechanism 10 is employed which carries a plurality of tubular members 12 on a cross-bar 11. The members 12 have sharp tips 12' which are simultaneously pushed through the prepreg layer or layers 1. The cross bar 11 is so arranged that the threads 13 may easily be threaded through the tubular members 12. Once the threads 13 forming the pins 13a have passed through the layers 1, the tubular members 12 are pulled out of the layers 1 as shown in FIG. 5 and the threads 13 are severed as indicated by the dashed-dotted line 14 to form the pins 13a remaining in the prepreg layers which are now ready for the compression and curing steps. Rather than using a plurality of tubular members 12, it is also possible to use only one such member in a stitching type operation. A cutting along the line 14 would also follow the stitching. These steps may all take place automatically as on a sewing machine.

Although the invention has been described with reference to specific example embodiments, it will be appreciated, that it is intended, to cover all modifications and equivalents within the scope of the appended claims.

What is claimed is:

1. A method for strengthening a fiber reinforced structural component in which reinforcing fibers are embedded in a resin matrix comprising the following steps: arranging at least two resin preimpregnated fiber layers in parallel to each other, securing a plurality of reinforcing pins to a pin carrier (2, 2a), pressing said pin carrier with the pins secured thereto in a direction substantially perpendicularly to a plane defined by said preimpregnated fiber layers for driving said plurality of pins into both layers so that the pins extend approximately perpendicularly to an orientation of said fibers in said layers, compressing said preimpregnated fiber layers with said pins therein, and curing said resin matrix for bonding the resin matrix to said fibers and to said pins.

2. The method of claim 1, wherein said step of securing comprises assembling said pins in a belt or webbing forming said pin carrier so that the pins extend out of the pin carrier on both sides of the pin carrier, sandwiching the pin carrier with its pins between said at least two fiber layers, and then performing said compressing, curing and bonding steps.

3. The method of claim 1, wherein said step of securing comprises assembling said pins in a belt or webbing forming said pin carrier so that the pins extend out of the pin carrier on one side of the pin carrier, placing the so prepared pin carrier onto said fiber layers so that the pins point toward the fiber layers and then performing said compressing, curing and bonding steps.

4. The method of claim 3, wherein said placing step comprises rolling said pin carrier with the pins extending out of one side of the pin carrier onto said fiber layers so that the pins penetrate into the fiber layers.

5. The method of claim 1, further comprising bending said pins at the ends thereof as a result of said compressing step, whereby the bent ends of said pins are pressed into said fiber layers.

6. The method of claim 1, further comprising securing pins of metal to said pin carrier.

7. The method of claim 1, further comprising securing pins of synthetic material to said pin carrier.

8. The method of claim 1, further comprising arranging said pins in rows and columns during said securing to said pin carrier.

* * * * *